US007308026B2

(12) United States Patent
Purho

(10) Patent No.: US 7,308,026 B2
(45) Date of Patent: Dec. 11, 2007

(54) METHOD FOR SIGNAL ESTIMATION IN A RECEIVER

(75) Inventor: Juha Purho, Helsinki (FI)

(73) Assignee: Nokia Corporation, Espoo (FI)

( * ) Notice: Subject to any disclaimer, the term of this patent is extended or adjusted under 35 U.S.C. 154(b) by 669 days.

(21) Appl. No.: 10/468,787

(22) PCT Filed: Dec. 21, 2001

(86) PCT No.: PCT/IB01/02814

§ 371 (c)(1),
(2), (4) Date: Nov. 14, 2003

(87) PCT Pub. No.: WO03/055068

PCT Pub. Date: Jul. 3, 2003

(65) Prior Publication Data

US 2004/0076248 A1    Apr. 22, 2004

(51) Int. Cl.
*H03H 7/30* (2006.01)
(52) U.S. Cl. ........................ 375/233; 375/347
(58) Field of Classification Search ........ 375/229–230, 375/233, 350, 347
See application file for complete search history.

(56) References Cited

U.S. PATENT DOCUMENTS 5,175,862 A * 12/1992 Phelps et al. ................. 712/7
6,064,689 A * 5/2000 Vollmer et al. .............. 375/149

FOREIGN PATENT DOCUMENTS

WO    WO 99/65160    12/1999

OTHER PUBLICATIONS

Al-Dhahir et al, The Finite-Length Multi-Input Multi-Output MMSE-DEF; Oct. 2000, IEEE Transactions on Signal Processing, vol. 48, No. 10, pp. 2921-2936.*
"Design and Implementation of Channel Equalizers for Block Transmission Systems", Hwang et al, The 2001 IEEE International Symposium on Circuits and Systems, Sep. 5, 2001, pp. IV-354-IV-357, XP002902616.
"Schur-Type Methods Based on Subspace Considerations", Götze et al, ISCAS '97. Proceedings of 1997 International Symposium on Circuits and Systems. Circuits and Systems in the Information Age. Hong-Kong, Jun. 9-12, 1997, vol. 4, pp. 2661-2664, XP000805086.
"Design of FIR/IIR Lattice Filters Using the Circulant Matrix Factorization", Bae et al, MTS/IEEE Conference and Exhibition, Nov. 8, 2001, pp. 354-360, XP002902617.

* cited by examiner

*Primary Examiner*—Chieh M. Fan
*Assistant Examiner*—Freshteh N Aghdam
(74) *Attorney, Agent, or Firm*—Squire, Sanders & Dempsey L.L.P.

(57) ABSTRACT

In a method for a receiver a signal is received at the receiver, where after a Cholesky factor or a block Cholesky factor of the Schur complement or a negative of the Schur complement of a matrix is determined at a processor entity by deriving a generator matrix of the Schur complement or the negative of the Schur complement from the generator matrix of the matrix and then applying a Schur algorithm to the generator matrix of the Schur complement or the negative of the Schur complement. The derivation comprises permutating at least a part of matrix columns below a certain row, shifting these columns downward a predefined number of rows and deleting a number of top rows. A filter for the signal may then be defined by computing filter coefficients for filtering the signal based on the derived Cholesky factor or block Cholesky factor. In another application a received signal is estimated based on similar determinations.

17 Claims, 2 Drawing Sheets

METHOD FOR SIGNAL ESTIMATION IN A RECEIVER

FIELD OF THE INVENTION

The present invention relates to receivers, and in particular to functions such as signal estimation and/or filter selection in a receiver. The present invention may also be employed in other applications wherein factorisation of a matrix is required.

BACKGROUND OF THE INVENTION

Various receivers and reception of signals at a receiver as such are known. For example, receivers may be used by various radio communication systems such as public land line mobile networks (PLMN) or satellite based communication system for reception of signals from transmitter stations. The skilled person familiar with radio communication systems knows the basic technology, and it will thus not be described in any greater detail. It is sufficient to note that in a typical wireless communication system a receiver part of a receiving station receives radio frequency (RF) signals that have been generated and transmitted by a transmitting station. When a signal is received at the receiving station the radio frequency signal needs typically be processed. For example, operations such as filtering of the RF signals, down-conversion from the radio frequency to baseband frequency and so on may be performed.

Signals may be transmitted in a plurality of frequency bands. Signals associated with different transmissions may also be transmitted on a frequency band. Upon reception of such signals the signals need to be separated from each other at the receiver. The separation can be accomplished by means of a filter function of the receiver. The filtering of a signal is accomplished by an appropriate filter that has been selected among a plurality of possible filters. Thus the filtering function shall be able to select a correct filter for a particular reception of signals so as to optimise the desired signal in relation to interference and noise.

The separation is required e.g. in a so called MIMO (multiple-input multiple-output) transceiver. A MIMO transceiver comprises multiple input and output antennae.

Theoretically a MIMO transceiver provides more capacity in proportion to the number of input/output antennae.

A MIMO reception method is presented in detail in publication 'IEEE Transactions on signal processing', Vol. 48, No. 10, October 2000 in an article by N. Al-Dhahir and A. H. Sayed titled 'The Finite-Length Multi-Input Multi-Output MMSE-DFE'. This article describes closed form derivations for the optimum filter settings of a finite-length MIMO minimum-mean-square-error decision feedback equaliser (MMSE-DFE) under three multi-user detection scenarios. Fast factorisation algorithms are given for deriving the so called Cholesky factors of matrices with a displacement structure. The Cholesky factor is also sometimes referred to as a lower triangular factor of a matrix. The article derives MIMO MMSE-DFE prefilter computation algorithms suitable for a real-time implementation. The MMSE-DFE type of pre-filter can be used, without limiting to these, e.g. in the GSM-EDGE (Global System for Mobile—Enhanced Data rate for GSM Evolution) receivers.

The complete derivation of optimum feedforward and feedback matrix filter algorithms is rather long and tedious. Instead of repeating it in here those interested can find the prior art derivation from the above referenced article by N. Al-Dhahir and A. H. Sayed. Further information on the mathematical basis of the fast algorithms, especially displacement, shift matrices and the generalized Schur algorithm applied here, can be found in the book 'Fast Reliable Algorithms for Matrices with Structure', edited by T. Kailath and A. H. Sayed (SIAM 1999).

A brief description of symbols used in the equations is given below before discussing the background art in more detail. In the equations:

$\upsilon$ maximum length of all the $n_o n_i$ channel impulse responses $D_n$ Noise variance matrix $D_x$ Input variance matrix F Combined shift-matrix G Generator matrix for the Fast Factorization H Channel matrix containing channel impulse responses I Unit matrix J Signature matrix: $diag(I_p, -I_q)$ L The result of the factorization of matrix M. L is a lower triangular matrix with positive diagonal entries, i.e. the Cholesky factor.

$N_f$ Filter length l oversampling factor $n_i$ number of input antennas $n_o$ Number of output antennas $R_{nn}$ Noise auto-correlation matrix $R_{xx}$ Input auto-correlation matrix T Channel impulse responses (top row of matrix H)

$Z_{ni}$ Shift matrix for noise auto-correlation $Z_{no}$ Shift matrix for input auto-correlation The following notations are also used in this description:

diag(a,b) diagonal matrix with the elements a and b on the diagonal mod modulo operator (.)* complex-conjugate transpose of a matrix or a vector $(.)^{-1}$ matrix inverse

[a b . . . ] vector consisting of the elements a,b, . . .

G(c) G after c iterations of the Fast Factorization algorithm

The Schur complement mentioned later can be defined by matrix:

$$R = \begin{vmatrix} P_i & Q_i^* \\ Q_i & S_i \end{vmatrix}$$

The Schur complement of R is:

$$R_i = S_i - Q_i P_i^{-1} Q_i^*$$

The relevant part of the above referenced article that is the subject of this specification is the derivation of a Cholesky factor for matrix R, defined as $$R = R_{xx}^{-1} + H^* R_{nn}^{-1} H$$

The the Cholesky factor of R and its inverse can be used in the calculation of optimal feedforward and feedback filter matrices. The above referenced article by Al-Dhahir and Sayed presents formulas for one way of calculating the feedback and feedforward filters using the Cholesky factor (or Block Cholesky factor) of R. The negative of R can be obtained as the Schur complement of the block-Hermitian matrix M.

$$M = \begin{vmatrix} R_{nn} & H \\ H^* & -R_{xx} \end{vmatrix}$$

which satisfies $$M - FMF^* = \begin{vmatrix} D_n & 0 & T & 0 \\ 0 & 0 & 0 & 0 \\ T^* & 0 & -D_x^{-1} & 0 \\ 0 & 0 & 0 & 0 \end{vmatrix}$$

I.e. the matrix M represents a displacement structure. In other words, since R is the (negative of) Schur complement of M this means that its lower triangular decomposition is a (lower-right corner) sub-matrix of the lower triangular decomposition of M.

Input auto-correlation matrix $R_{xx}$ and noise auto-correlation matrix $R_{nn}$ are in turn defined in the article as block-diagonal matrices $$R_{xx} = \begin{vmatrix} D_x & & \\ & \ldots & \\ & & D_x \end{vmatrix}$$

$$R_{nn} = \begin{vmatrix} D_n & & \\ & \ldots & \\ & & D_n \end{vmatrix}$$

$D_x$ ($n_i \times n_i$) and $D_n$ ($n_01 \times n_01$) are block-diagonal matrices with input and noise variances.

$$D_x = \begin{vmatrix} \sigma_{x,1}^2 & & \\ & \ldots & \\ & & \sigma_{x,ni}^2 \end{vmatrix}$$

$$D_n = \begin{vmatrix} \sigma_{n,1}^2 I_1 & & \\ & \ldots & \\ & & \sigma_{n,no}^2 I_1 \end{vmatrix}$$

The Channel Matrix H is given by $$H = \begin{vmatrix} H_0 & H_1 & \ldots & H_v & & & \\ & H_0 & H_1 & \ldots & H_v & & \\ & & & \ldots & & & \\ & & & H_0 & H_1 & \ldots & H_v \end{vmatrix}$$

where each $H_i$ is $n_01 \times n_i$ and where H has $N_f$ block rows and ($N_f + v$) block columnsHHhhh.

$$T = [H_0 H_1 \ldots H_v],$$

which is $n_0 1 \times n_i v$.

Matrix M satisfies M−FMF*=GJG, where $$J = \begin{vmatrix} I_{no \times 1} & & \\ & -I_{no \times 1} & \\ & & -I_{ni} \end{vmatrix}$$

and G is a so-called generator matrix. The generator matrix G is given by $$G = \begin{vmatrix} D_n^{1/2} & 0 & 0 \\ 0_{no \times 1} & 0_{no \times 1} & 0 \\ & \ldots & \\ H_0^* & H_0^* & D_x^{-1/2} \\ H_1^* & H_1^* & 0_{ni} \\ & \ldots & \\ H_v^* & H_v^* & 0_{ni} \\ 0_{ni} & 0_{ni} & 0_{ni} \\ \vdots & \vdots & \vdots \\ 0_{ni} & 0_{ni} & 0_{ni} \end{vmatrix}$$

wherein $H_i = D_n^{-1/2} H_i$. The matrix M is a structured matrix which is amenable to fast factorization by the so-called generalized Schur algorithm.

There are $N_f - 1$ block zero rows between $D_n^{1/2}$ and $H_0^*$ and $N_f + v - 1$ block zeros in the last column underneath $D_x^{-1/2}$.

The above referenced article and book describe the Fast Standard Factorization algorithm (the generalized Schur algorithm) for factoring into lower triangular form L, wherein $$M = LJL^*$$

and $$L = \begin{vmatrix} L_1 & \\ L_2 & L_3 \end{vmatrix}$$

where $L_3$ has dimensions $(N_f + v)n_i \times (N_f + v)n_i$. The $L_3$ parameter is a desired lower triangular factor of R, i.e. $R = L_3 L_3^*$. This factor can be used for the computation of the feedforward and feedback filters.

The shift matrix F is defined as $$F = \begin{vmatrix} Z_{no} & \\ & Z_{ni} \end{vmatrix}$$

where $$Z_{no} = \begin{vmatrix} 0_{nol} & & & \\ I_{nol} & 0_{nol} & & \\ & \ldots & & \\ & & I_{nol} & 0_{nol} \end{vmatrix}$$

and $$Z_{ni} = \begin{vmatrix} 0_{ni} \\ I_{ni} & 0_{ni} \\ & \ldots \\ & & I_{ni} & 0_{ni} \end{vmatrix}$$

The factorization leads to the form $$M = L \begin{vmatrix} I_{Nfnol} \\ & -I_{(Nf+v)ni} \end{vmatrix} L^* = L \; J_M \; L^*$$

where L is a louver triangular and $J_M$ is the inertia matrix.

The fast factorization algorithm for obtaining standard Cholesky factor is described below. Lets assume that $G(0) = G$, and $F(0) = F$. Each round i (i>=0) of the algorithm produces the next generator matrix $G(i+1)$, and for each new round one should increment i. The algorithm repeats the following steps as long as there are row left in the resulting matrix $G(i+1)$. For positive inertia entries in $J_M$ the procedure is:

1) The top row of the generator matrix $G(i)$ is transformed into [δ0 0 . . . 0] by (J–) unitary rotations.
2) Apply the transformation in 1 to all the rows in the generator matrix $G(i)$
3) The leftmost column is the next column in L
4) The leftmost column in $G(i)$ is multiplied by the shift matrix $F(i)$
5) To get $F(i+1)$, delete the first row and column of $F(i)$
6) Delete the top row of $G(i)$ to get $G(i+1)$
7) Return to step 1

For negative inertia entries in $J_M$ the procedure is:

1) The top row of the generator matrix $G(i)$ is transformed into [0 . . . δ0 . . . 0] by (J–) unitary rotations. Here δ is the entry number $n_0$ 1+1, i.e. the first entry for which the corresponding entry in J is –1.
2) Apply the transformation in 1 to all the rows in the generator matrix $G(i)$.
3) The ($n_0$ 1+1)th column is the next column in L
4) The ($n_0$ 1+1)th column in $G(i)$ is multiplied by the shift matrix $F(i)$
5) To get $F(i+1)$, delete the first row and column of $F(i)$
6) Delete tile top row of $G(i)$ to get $G(i+1)$
7) Return to step 1

When $G(i)$ has no rows left, the algorithm has produced a factorisation of matrix M, that is a lower triangular matrix L with positive diagonal entries. Those interested can find a thorough description of the prior art algorithm from the previously mentioned article by Al-Dhahir and Sayed and/or the book by Kailath and Sayed.

However, the inventor has found that the suggested factorisation is a substantially complex procedure, the proposed algorithm employing substantially heavy matrix computations. The computations are time consuming and also require lots of computing capacity from the receiving entity for selection of a correct filter. The method may also not be fast enough for all receiver applications.

SUMMARY OF THE INVENTION

Embodiments of the present invention aim to address one or several of the above problems and to provide an improved solution for operations such as selection of a filter in a receiver or estimation of a signal.

According to one aspect of the present invention, there is provided a method for a receiver, the method comprising: receiving a signal at a receiver; deriving at a processor entity a Cholesky factor or a block Cholesky factor of the Schur complement or a negative of the Schur complement of a matrix by deriving a generator matrix of the Schur complement or the negative of the Schur complement from the generator matrix of the matrix and then applying a Schur algorithm to the generator matrix of the Schur complement or the negative of the Schur complement, the derivation comprising permutating at least a part of matrix columns below a certain row, shifting these columns downward a predefined number of rows and deleting a number of top rows; and defining a filter for the signal by computing filter coefficients for filtering the signal based on the derived Cholesky factor or block Cholesky factor.

According to another aspect of the present invention there is provided a method in a receiver, the method comprising: receiving a signal; determining at a processor entity an estimate of the received signal where a Cholesky factor or a block Cholesky factor of the Schur complement of a Matrix is used for finding the inverse of the Schur complement matrix, wherein the derivation of the generator matrix for the Schur complement comprises permutating at least a part of matrix columns below a certain row, shifting these columns downward a predefined number of rows and deleting a number of top rows; and computing the estimate of the signal based on the derived Cholesky factor or block Cholesky factor.

According to another aspect of the present invention there is provided a receiver comprising: antenna means for receiving a signal; and a processor entity for deriving a Cholesky factor or a block Cholesky factor of the Schur complement or a negative of the Schur complement of a matrix and for defining a filter for the signal by computing filter coefficients for filtering the signal based on the derived Cholesky factor or block Cholesky factor, the processor entity being arranged to derive a generator matrix of the Schur complement or the negative of the Schur complement from the generator matrix of the matrix and then to apply a Schur algorithm to the generator matrix of the Schur complement or the negative of the Schur complement, the derivation being provided by permutating at least a part of matrix columns below a certain row, shifting these columns downward a predefined number of rows and deleting a number of top rows.

According to another aspect of the present invention there is provided a receiver, comprising: antenna means for receiving a signal; and a processor entity for determining an estimate of the received signal based on a derived Cholesky factor or block Cholesky factor by means of an arrangement wherein the Cholesky factor or a block Cholesky factor of the Schur complement of a matrix is used for finding the inverse of the Schur complement and the derivation of tile generator matrix for the Schur complement comprises permutating at least a part of matrix columns below a certain row, shifting these columns downward a predefined number of rows and deleting a number of top rows.

The embodiments of the invention may reduce the complexity of finding a filter matrix Such as a feedforward filter matrix in a receiver and/or estimation of a received signal.

Complexity may be reduced especially in a MIMO environment. A faster filter selection and/or signal estimation may thus be provided.

BRIEF DESCRIPTION OF DRAWINGS

For better understanding of the present invention, reference will now be made by way of example to the accompanying drawings in which.

DESCRIPTION OF PREFERRED
EMBODIMENTS OF THE INVENTION

Figure 1:
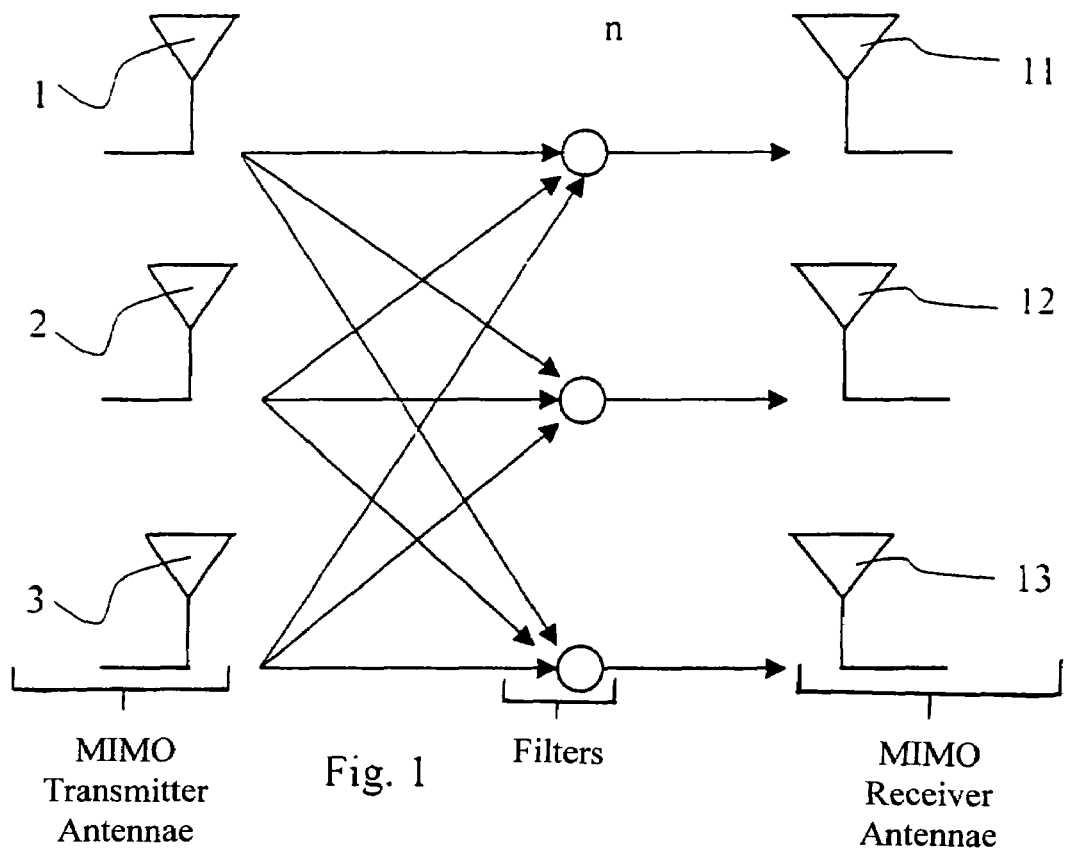
FIG. 1 shows an environment wherein the present invention may me be employed.

Reference is first made to FIG. 1 which shows a block diagram for an arrangement wherein the optimised fast factorisation for a multi-input multi-output (MIMO) reception environment described below can be applied to. In FIG. 1 radio frequency signals are transmitted in a multi-input multi-output (MIMO) channel. More particularly, signals transmitted from a multi-antenna transmitter antennae 1 to 3 are received by antennae 11 to 13 of a multi-antenna receiver. As shown schematically, the signals on a frequency channel become mixed at n during the transmission. Thus the arrows n designate a combined signal that includes components from all of the RF signals from antennae 1 to 3 and possible noise components.

Each of the reception antennae 11 to 13 of a multi-antennae receiver 10 will thus receive a mixture of signals from transmitter antennae 1 to 3. Separation of the received signals is required in order to be able to produce a meaningful output signal from the combined signals received by antennae 11 to 13. The separation can be provided by means of a filter that is optimal for a particular signal.

The filter can be determined based on analysis of the received signal. In accordance with an embodiment optimal feed-forward filters for a minimum-mean-square-error decision feedback equalizer (MMSE-DFE) need to be calculated for each of the received signals.

Figure 2:
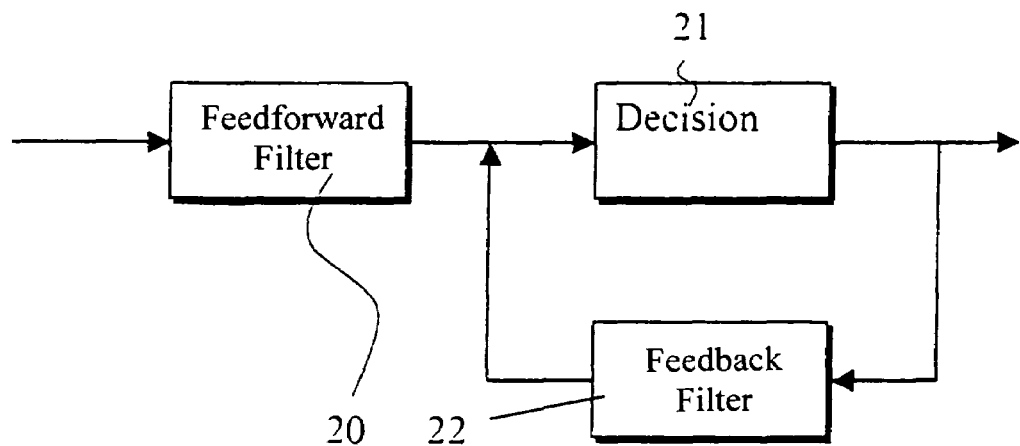
FIG. 2 shows a filtering function.
Figure 3:
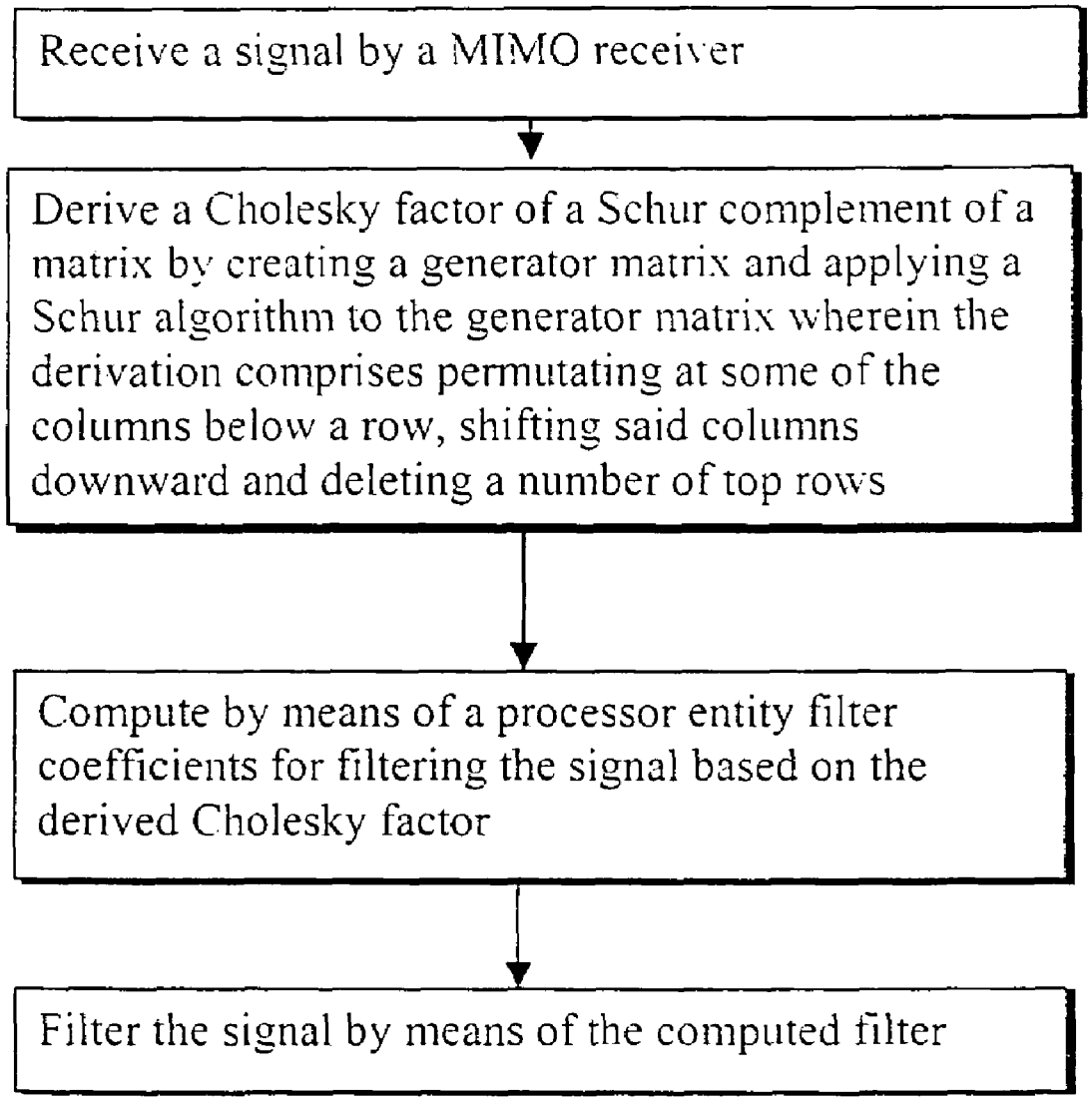
FIG. 3 is a flowchart illustrating the operation of an embodiment.

FIG. 2 describes a possible structure of a decision-feedback equalizer. The manner how a feedforward filter 20 and a feedback filter 22 can be employed in decision feedback equalizer is presented to illustrate how the feedforward and feedback filters may be used in DFE equalization. More particularly, FIG. 2 describes how the signal that is processed through the feedforward filter is fed into the equalizer. Block 21 illustrates is a symbol-by-symbol detector. Input data for the feedforward filter comprises the input signal from the receiver antennas. The resulting data is referred herein as filtered data. It shall be appreciated that the Cholesky factor (or block Cholesky factor) is used only in obtaining the filter taps, and as such does not have any relation to the filtered data.

The present invention provides a fast way of calculating the filter taps for these filters. The input to the feedforward filter 20 is the received signal sequence. The input to the feedback filter 22 is the sequence of decisions on previously detected symbols. Since the operation of the decision-feedback equalisers as such is known, this will not be explained in any greater detail herein.

In a preferred embodiment a matrix R is amenable to factorization by a generalized Schur algorithm. Computation of the pre-filter coefficients of a MMSE-MFE decision feedback equaliser is made faster by simplifying the required computations. The inventor has found that when the noise is white it is possible to analytically derive from G a generator matrix $$G_R = G(N_f * n_0 * 1)$$

for which $$R - Z_{ni} R Z_{ni}^* = G_R J G_R^*,$$

instead of calculating $G_R$ as a result of the first $N_f * n_0 * 1$ rounds of the Schur algorithm applied to G as was suggested in the prior art solution by Al-Dhahir and Sayed. This results in a substantial decrease in complexity.

The noise can be assumed to be white in most instances. The noise may also be whitened e.g. by means of an appropriate filter arrangement.

It shall be appreciated that in this specification the term "round" means the production of G(i+1) from G(i) by the generalized Schur algorithm. That is, when computing the filter parameters we do not need to go through producing the generator matrices $G(1)$–$G(N_f * n_0 * 1 - 1)$ and the corresponding sub-matrices $L_1$ and $L_2$ of the lower triangular of M. The generator matrix $G_R = G(N_f n_0 1)$ after the first $N_f n_0 1$ rounds can be calculated analytically without going through the steps, and is sufficient for the production of the matrix $L_3$, which is the desired lower triangular factor of R.

In a preferred embodiment the generalized Schur algorithm is applied to $G_R$ instead of G. An essential realisation in here is that it is not necessary to decompose the entire matrix M. Instead, a generator matrix $G_R$ can be found that (when applied to the generalized Schur algorithm) only produces the sub-matrix $L_3$ which is the lower triangular factor of R. The sub-matrix $L_3$ has the same dimensions as the matrix R: $(N_f + \upsilon) n_i \times (N_f + \upsilon) n_i$. In the above the term $n_i$ is the number of transmitter antennae. The term $\upsilon$ is the maximum of the channel impulse response lengths. These terms as such are known by the skilled person and the derivation of these terms does not form an essential part of the invention. Therefore these terms and derivation thereof will thus not be explained in more detail. It should also be noted that $G_R$ can be also used to obtain a block Cholesky factor of matrix R by applying the fast block factorization algorithm described in the article by Al-Dhahir and Sayed.

The above discussed sub-matrix $L_3$ is needed for calculating the optimal feedback and/or feed-forward filters for minimum-mean-square-error decision feedback equalizer (MMSE-DFE). The improved method provides the necessary input matrix $G(N_f n_0 1)$ needed for calculating $L_3$. The inventor has found that a complete factorisation of the matrix M is not required during the computations since only the sub-matrix $L_3$ is required. That is, we are only interested in the sub-matrix element $L_3$ in matrix L. This means that we are uninterested in the first $N_f n_0 1$ columns in matrix L (essentially the components $L_1$ and $L_2$) and do not need to produce them. The sub-matrix $L_3$ can be produced by analytically deriving a generator matrix for it and applying the generalized Schur algorithm to that generator matrix.

A more detailed example how to pass at least few of the first rounds will be described below. It shall be appreciated that in order to avoid unnecessary repetition of the discussion above the matrices and other terms discussed above will not be reproduced. Instead, a reference is made to the description of the background whenever this is appropriate.

The execution of the first $N_f n_0 1$ rounds may be improved in application wherein the Fast Factorization Algorithm described above is used when $D_n$ is diagonal. This can also be expressed as calculating $G(N_f n_0 1)$. The last $(N_f+\upsilon)*n_i$ rounds of the algorithm are not affected by this method, and therefore these are not described.

A substantial improvement to the above described fast factorisation algorithm can be found which $D_n$ is diagonal, i.e. noise is white. When this is the case, the unitary rotations in the corresponding steps are reduced into permutations. This means that a rotation of the matrix can be achieved simply by swapping two columns. This may be applied to the first $n_0 1$ columns corresponding to the columns with positive diagonal elements in J, which is sufficient in this case.

Multiplying the first column with F means also that the elements in the first column below row $N_f n_0 1$ are shifted $n_i$ rows downwards with zeros added to their place. Due to the column permutations each of the first $n_0 1$ columns (below row $N_f n_0 1$) gets shifted downwards once every $n_0 1$ rounds of the algorithm.

All of the $N_f n_0 1$ first steps have preferably corresponding positive inertia entries, that is the corresponding diagonal elements in $J_M$ are positive (+1.0).

The inventor has found that if the value of matrix $G(N_f n_0 1)$ could be found without going through the first $N_f n_0 1$ rounds of the algorithm, it would be possible to calculate the desired sub-matrix $L_3$. The following chapter presents a particular example of this.

In the processing, each one of the $n_0 1$ first columns in the generator matrix below the $N_f n_0 1$:th row is moved $N_f*n_i$ rows downwards. The positions of the matrix left empty are then filled with zeros. In the next step the permutation of the columns after x iterations of the Fast Factorisation algorithm are given by the formulas $f_0(x) = x \bmod n$ $f_k(x) = (n-1) - [((x \bmod n(n-1)) + n(n-1-k)) \bmod n(n-1)] \div (n-1)$ wherein n×n denotes the dimension of the upper-left sub-matrix (in this case n=$n_0 1$, the dimension of $D_n$)

k denotes the column number and x refers to the G(x) for which permutation is to be computed (in this case $N_f n_0 1$)

$f_k(x)$ denotes corresponding original column.

For example, if the original columns of matrix G below $N_f n_0 1$ rows were [a b c d] and after x iterations they were [b c d a], then $f_0(x)=1$, $f_1(x)=2$, $f_2(x)=3$, and $f_3(x)=0$.

Finally the top $N_f n_0 1$ rows are deleted to obtain $G_R$(=G ($N_f n_0 1$)).

An alternative to using the above discussed formula is finding out the permutation and the downward shifts by running the prior art algorithm once. The permutation and downward shifts will be the same for any generator matrix G with the same parameters $N_f$, $\upsilon$, $n_i$, $n_0$, and 1, on the condition that $D_n^{1/2}$ is a diagonal matrix (i.e. noise is white).

So if the original generator matrix G was $$G = \begin{vmatrix} D_n^{1/2}(0) & 0 & 0 \\ 0 & D_n^{1/2}(1) & 0_{n_0 \times 1} & 0 \\ & \cdots & \\ & 0 & D_n^{1/2}(n_0 l - 1) \\ 0 & 0 & 0 & 0 \\ & \cdots & \\ a(0) & a(1) \ldots a(n_o l - 1) & \ldots & D_x^{-1/2} \\ 0_{ni} & 0_{ni} & 0_{ni} \\ \vdots & \vdots & \vdots \\ 0_{ni} & 0_{ni} & 0_{ni} \end{vmatrix}$$

where a(i) are $N_f n_i \times 1$ vectors and there are $N_f + \upsilon - 1$ $n_i \times n_i$ block zero sub-matrices below $D_x^{-1/2}$.

The matrix $\Gamma_R = \begin{vmatrix} 0(N_f n_o l \times (2 * n_o l + n_i l)) \\ G(N_f n_o l) \end{vmatrix}$ would be after $N_f n_0 1$ iterations of fast factorisation:

$\Gamma_R =$ $$\begin{vmatrix} 0 \ 0 & 0 \ 0 \ 0 \\ 0 \ 0 & 0 \ 0 \ 0 \\ & \cdots \\ 0 \ 0 \ 0 & 0 \ 0 \ 0 \\ & \cdots \\ 0 \ 0 \ldots 0 \ldots a(n_o l) \ldots D_x^{-1/2} \\ \cdots \\ a(f_o(N_f n_o l)) \ldots a(f_{fnol-1}(N_f n_o l)) \ 0 \ 0 \end{vmatrix} \begin{matrix} \} N_f n_o l \text{ rows of zeros} \\ \\ \} \begin{matrix} N_f n_i \text{ rows where the first} \\ n_o l \text{ elements are zeroes} \end{matrix} \end{matrix}$$

and the corresponding generator matrix $G_R$ for R after the elimination of the $N_f n_0 1$ top zero lines below. If the vectors a(i) do not fit into $\Gamma_R$ (and $G_R$) after they have been moved downwards $N_f n_i$ rows, they can be truncated so as to fit them into the matrix. Depending on the values of $N_f$ and $\upsilon$ there may be zero elements below the vectors a(i) in $\Gamma_R$ and $G_R$.

$$G_R = \begin{vmatrix} 0 \ 0 \ \ldots 0 \ \ldots a(n_o l) \ \ldots D_x^{-1/2} \\ \cdots \\ a(f_o(N_f n_o l)) \ \ldots a(f_{fnol-1}(N_f n_o l)) \ 0 \ 0 \end{vmatrix} \} \begin{matrix} N_f n_i \text{ rows where} \\ \text{the first } n_o l \\ \text{elements are zeroes} \end{matrix}$$

This matrix can be directly calculated by the above formulas without going through the first $N_f n_0 1$ steps of the fast factorization algorithm. Alternatively, the algorithm can be run in advance to find out how the column permutation is changed after the first $N_f n_0 1$ rounds.

This idea covers analytic calculation of any G(x) for optimizing the calculation of the Cholesky factor of R. The concept can be extended to cover the derivation of G(x) for any matrix M having a Schur complement matrix and a generator matrix, that satisfies the condition that the upper x rows are zeroes expect for a diagonal upper-left sub-matrix of dimension n*n; and the calculation of the Cholesky factor based on G(x). Note, that if x mod n≠0, then all the vectors a(i) are moved downward $n_i^*(x/n)$ rows, except the vectors a(i) for which $i<(x \bmod n)$ are moved downward extra $n_i$ rows. The formula for the permutation is the same even in that case. The number of top rows to be deleted from G(0) (after permutations and downward shifts) to obtain G(x) is x. (n is again the dimension of the top left diagonal submatrix, in our case the dimension of $D_n$ i.e. $n_0 1$.) Note also, that in the general factorization case $n_i$ denotes just the shift performed by $Z_{ni}$, not necessarily the number of antennas.

The Inventor has found that the present invention may approximately halve the processing time needed for factorizing the matrix R with typical parameters $N_f=8$, $n_0=2$, $n_i=2$, and $l=2$ from 360 000 clock cycles of the prior art method to 175 000 clock cycles. This is a substantial improvement as the Cholesky factorization is responsible for over 50% of the prefilter tap calculation complexity even when optimized. This result has been obtained in simulations using a floating point model with no special optimizations. The clock cycle measurements were made with Pentium clock cycle counter using 600 MHz Pentium III.

Another example of possible application of the above discussed method is estimation of a signal. Let assume that the received and transmitted signals y and x are linearly related, say such that $$y=Hx+n,$$

where y is the received signal, x the transmitted signal, H the channel matrix and n zero-mean random-noise vector uncorrelated with x.

The corresponding minimum-mean-square-error (m.m.s.e.) estimate of x can then be written as $$\hat{x}=K_0 y,$$

where $K_0=(R_{xx}^{-1}+H^*R_{nn}^{-1}H)^{-1}H^*R_{nn}^{-1}$.

The inverse of the term $R_{xx}^{-1}+H^*R_{nn}^{-1}H$ can be found by First finding the Cholesky factors L and D in $$R_{xx}^{-1}+H^*R_{nn}^{-1}H=LDL^*$$

by the above presented fast method. The inverse $L^{-1}$ can then be determined e.g. by back-substitution from LX=I. Finally $$(R_{xx}^{-1}+H^*R_{nn}^{-1}H)^{-1}=(LDL^*)^{-1}=L^{*-1}D^{-1}L^{-1}.$$

In general, the method can be applied to any estimation problem, where the Cholesky factor or inverse of a matrix with displacement structure is needed. The above disclosed solution is applicable also for seeking an optimised solution for any linear model.

Instead of a "standard" Cholesky factor, a block Cholesky factor may be used. Opposed to a standard Cholesky factor the block Cholesky factor is a lower triangular factor composed of (e.g. $n_i \times n_i$) blocks of elements. A more detailed description of the block Cholesky factor can be found from the above refereced article by Al-Dhahir, Sayed, see page 2926 lower right corner the scalar and block definitions for L.

This invention presents an improvement to the fast algorithm producing the Cholesky factor. The fast factorisation method may be used for any matrix, providing that the matrix represents a displacement structure, has a generator matrix G for which $M-FMF^*=GJG^*$, and that the upper-left corner component in place of $D_n$ in the generator matrix is a diagonal matrix. In the general case the matrix F may be any shift matrix.

It should be appreciated that whilst embodiments of the present invention have been described in relation to MIMO multi-antenna stations, embodiments of the present invention are applicable to any other suitable type of radio equipment wherein properties of signals need to be estimated. This includes single antenna stations.

In the above a method is presented for finding out an intermediate generator-matrix for the so-called generalized Schur algorithm. For a special type of a sparse matrix it is possible to skip over a number of steps of this algorithm, when only partial factorisation is needed. The embodiments are believed to be especially suitable for use in optimisation of a MIMO (multiple input and output antennas) reception process. Due to the reduced complexity the performance of the prior art solutions can be improved by this invention, and the use of a preceding factorisation algorithm can be completely eliminated for Fast Block Factorisation, such as the one suggested by the above discussed article.

It is also noted herein that while the above describes exemplifying embodiments of the invention, there are several variations and modifications which may be made to the disclosed solution without departing from the scope of the present invention as defined in the appended claims.

The invention claimed is:

1. A method for a receiver, the method comprising:
receiving a signal at a receiver;
deriving at a processor entity a Cholesky factor or a block Cholesky factor of the Schur complement or a negative of the Schur complement of a matrix by deriving a generator matrix of the Schur complement or the negative of the Schur complement from the generator matrix of the matrix and then applying a Schur algorithm to the generator matrix of the Schur complement or the negative of the Schur complement, the derivation comprising permutating a part of matrix columns below a certain row, shifting these columns downward a predefined number of rows and deleting a number of top rows; and
defining a filter for the signal by computing filter coefficients for filtering the signal based on the derived Cholesky factor or block Cholesky factor, wherein the method provides the matrix to provide a fast filter selection or signal estimation in the receiver, and wherein the selection of a correct fast filter for a particular reception of signals results in optimization of a desired signal in relation to interference and noise.

2. A method as claimed in claim 1, comprising use of a generalised Schur algorithm in the factorisation.

3. A method as claimed in claim 1, wherein the derivation of the generator matrix for the Schur complement or the negative of the Schur complement is at least partially an analytic operation.

4. A method as claimed in claim 1, wherein the filter comprises a feedforward filter and/or a feedback filter of an equalizer.

5. A method as claimed in claim 4, wherein the equalizer comprises a decision-feedback equalizer.

6. A method as claimed in claim 5, wherein a minimum-mean-square-error decision feedback equalizer (MMSE-DFE) prefilter is computed.

7. A method as claimed in claim 1, wherein a multiple of simultaneous signals is received by means of a plurality of antennae.

8. A method as claimed in claim 7, wherein the reception of signals occurs in the multiple-input multiple-output (MIMO) environment.

9. A method as claimed in claim 1, wherein the Cholesky factor or a block Cholesky factor of a matrix with displacement structure for minimum-mean-square-error decision feedback equalizer (MMSE-DFE) prefilter calculations is computed, the matrix to be factorized being based on an input auto-correlation matrix, a noise auto-correlation matrix, and a channel matrix.

10. A method in a receiver, comprising:
receiving a signal;
determining at a processor entity an estimate of the received signal where a Cholesky factor or a block Cholesky factor of the Schur complement of a matrix is used for finding the inverse of the Schur complement matrix, wherein the derivation of the generator matrix for the Schur complement comprises permutating a part of matrix columns below a certain row, shifting these columns downward a predefined number of rows and deleting a number of top rows; and
computing the estimate of the signal based on the derived Cholesky factor or block Cholesky factor, wherein the method provides the generator matrix to provide a fast filter selection or signal estimation in the receiver, and wherein the selection of a correct fast filter for a particular reception of signals results in optimization of a desired signal in relation to interference and noise.

11. A method as claimed in claim 10, comprising use of a generalised Schur algorithm in the factorisation.

12. A method as claimed in claim 10, wherein the derivation of the generator matrix for the Schur complement or the negative of the Schur complement is at least partially an analytic operation.

13. A method as claimed in claim 10, wherein the Cholesky factor of a matrix which can be presented as a Schur complement of another matrix is computed for determining the minimum-mean-square-error (MMSE) estimate of the received signal when the signal adheres to a linear model.

14. A receiver comprising:
receiving means for receiving a signal;
a processor entity for deriving a Cholesky factor or a block Cholesky factor of the Schur complement or a negative of the Schur complement of a matrix and for defining a filter for the signal by computing filter coefficients for filtering the signal based on the derived Cholesky factor or block Cholesky factor, the processor entity being configured to derive a generator matrix of the Schur complement or the negative of the Schur complement from the generator matrix of the matrix and then to apply a Schur algorithm to the generator matrix of the Schur complement or the negative of the Schur complement, the derivation being provided by permutating a part of matrix columns below a certain row, shifting these columns downward a predefined number of rows and deleting a number of top rows, wherein the receiver provides the generator matrix to provide a fast filter selection or signal estimation in the receiver, and wherein the selection of a correct fast filter for a particular reception of signals results in optimization of a desired signal in relation to interference and noise.

15. A receiver, comprising:
receiving means for receiving a signal;
a processor entity for determining an estimate of the received signal based on a derived Cholesky factor or block Cholesky factor by means of an arrangement wherein the Cholesky factor or a block Cholesky factor of the Schur complement of a matrix is used for finding the inverse of the Schur complement and the derivation of the generator matrix for the Schur complement comprises permutating a part of matrix columns below a certain row, shifting these columns downward a predefined number of rows and deletion of a number of top rows, wherein the receiver provides the generator matrix to provide a fast filter selection or signal estimation in the receiver, and wherein the selection of a correct fast filter for a particular reception of signals results in optimization of a desired signal in relation to interference and noise.

16. A receiver comprising:
a processor entity configured to derive a Cholesky factor or a block Cholesky factor of the Schur complement or a negative of the Schur complement of a matrix and to define a filter for the signal by computing filter coefficients for filtering a received signal based on the derived Cholesky factor or block Cholesky factor, the processor entity being configured to derive a generator matrix of the Schur complement or the negative of the Schur complement from the generator matrix of the matrix and then to apply a Schur algorithm to the generator matrix of the Schur complement or the negative of the Schur complement, the derivation being provided by permutating a part of matrix columns below a certain row, shifting these columns downward a predefined number of rows and deleting a number of top rows, wherein the receiver provides the generator matrix to provide a fast filter selection or signal estimation in the receiver, and wherein the selection of a correct fast filter for a particular reception of signals results in optimization of a desired signal in relation to interference and noise.

17. A receiver, comprising:
a processor entity configured to determine an estimate of a received signal based on a derived Cholesky factor or block Cholesky factor by an arrangement wherein the Cholesky factor or a block Cholesky factor of the Schur complement of a matrix is used for finding the inverse of the Schur complement and the derivation of the generator matrix for the Schur complement comprises permutating a part of matrix columns below a certain row, shifting these columns downward a predefined number of rows and deletion of a number of top rows, wherein the receiver provides the generator matrix to provide a fast filter selection or signal estimation in the receiver, and wherein the selection of a correct fast filter for a particular reception of signals results in optimization of a desired signal in relation to interference and noise.

* * * * *